Patented July 18, 1939

2,166,542

UNITED STATES PATENT OFFICE 2,166,542

OXYGEN-CONVERTIBLE COMPOSITIONS

Theodore F. Bradley, Stamford, Conn., assignor to American Cyanamid Company, New York, N. Y., a corporation of Maine No Drawing. Application September 24, 1937, Serial No. 165,485

7 Claims. (Cl. 260—6)

This invention relates to aqueous compositions containing resinous materials having the combined and unique characteristics of substantially complete miscibility with water and of oxygen-convertibility. It further relates to coating, impregnating and similar compositions containing such resinous materials.

The resinous products which characterize the present invention are of the alkyd type, yet they differ from the ordinary alkyds in the particular choice of their constituent acids and alcohols and in their physical properties.

Water-soluble alkyds previously described are confined to those which are derived from hydroxy acids, chiefly citric acid; and except in the case of the heat-convertible modifications are found to be permanently water-soluble. Moreover, the heat-convertible modifications also remain water-soluble unless condensed to the infusible stage by very prolonged heating at highly elevated temperatures. Such products are not oxygen-convertible, are usually quite hygroscopic, are easily softened by water, and thus have found little if any commercial application.

Another class of "water-soluble" alkyd resin has been derived from the ammonium, triethanolamine or alkali metal soaps of the more highly acidic types of the phthalic glycerides or like condensates. It is to be observed that these alkyds are in themselves insoluble in water and require combination with alkali to effect miscibility with water. Such alkyds are not, therefore, strictly water-soluble.

It is obvious that the combination of true water-solubility plus oxygen-convertibility constitutes a desirable commercial objective and thus attempts have been made to combine these features in one and the same resin. To date the only method known of inducing oxygen-convertibility is by the incorporation of the unsaturated fatty acids of the natural drying oils into the alkyd complex and attempts have been made to combine such fatty acids in water- or alkali-soluble resins of the aforesaid types. It was found, however, that the amounts of such acids which were capable of successful incorporation in the aforesaid resins were decidedly limited since these acids impaired the solubility in water proportionate to the amounts used. Therefore, when more than a very minor percentage of fatty acids was introduced, the resulting products only gave emulsions or sometimes even products which could not be properly dispersed.

Difficulty was also encountered in dissolving the alkali-soluble alkyd complexes in water because only highly acidic resins of acid number in excess of 100 could be used and since this required either a deficiency of polyhydric alcohol, a low degree of condensation, or of both, the resulting products were deficient in hardness, in their speed of convertibility, and in their ultimate water-resistance. The degree of oxygen-convertibility previously attained in water-soluble alkyd resins of the unsaturated fatty acid type has been greatly limited and the quality of said materials has left much to be desired for the reasons which have been mentioned.

One object of this invention is to produce aqueous compositions containing resinous or viscous substances which are miscible with water and which are suitable for use as plasticizing, softening or flexibilizing agents for glue, urea-formaldehyde resins and similar film-forming agents and for such other purposes as will be described.

It is a further object of the invention to provide water-soluble resins or viscous liquids which are capable of reacting with oxygen to yield useful coatings or impregnants of substantially infusible and insoluble form.

It is a still further object to prepare aqueous compositions having extensive commercial application.

I have found that these and other objects are attained with a new series of compositions having the desired properties of miscibility with water and also oxygen-convertibility. I have further found that by combining, under suitably regulated conditions, unsaturated acids of the type of maleic and fumaric acids with polyhydric alcohols containing at least three ether (—C—O—C—) linkages and having not over three hydroxyl groups, I may obtain water-soluble resins or viscous liquids which are capable of reacting with oxygen to yield useful products of substantially infusible and insoluble nature.

The following examples are illustrative of the principles and the practice of my invention:

Example 1

| | Parts by weight |
|---|---|
| Hexaethylene glycol | 5495 |
| Maleic anhydride | 1936 |

These molecular equivalent proportions were reacted in a partially closed container adapted to permit the free escape of the water of esterification. The temperature was taken to 210° C. in 35 minutes and was held at between 210° C. and 218° C. for an additional period of 93 minutes when the reaction was then discontinued.

The product which was obtained was a light amber-colored liquid having a viscosity of 46.3 poises at 25° C., a refractive index of 1.4822 at 25° C. and an acid number of 45.3. This product was completely soluble in water upon agitation therewith at room temperature and a 50% aqueous solution of the same was observed to possess a viscosity of less than 0.5 poise.

The product just described is not only heat-convertible but is also oxygen-convertible and unless oxygen is excluded from the reaction mixture or unless anti-oxidants be added, an oxygen-converted "skin" or gelled particles will form on or near the surface of the reaction mixture during the latter stages of the condensation or even during storage of the product thereafter. In order to avoid this pre-oxidation, the reaction is preferably carried out in an inert atmosphere such as the self-generated steam, $CO_2$ or the like.

Continued heating of the original reaction mixture substantially beyond the point which has been specified is observed to result ultimately in an infusible and insoluble polymer which, although solid, is most flexible and distensible. However, such heating is not desired for the preparation of the water-soluble products with which the invention is especially concerned.

Replacement of the hexaethylene glycol of Example 1, with an equivalent amount of triethylene glycol gives a different product which is not water-soluble.

*Example 2*

| | Parts by weight |
|---|---|
| Hexaethylene glycol | 805 |
| Fumaric acid | 331 |

This mixture was reacted at 200–220° C. until the acid number had reached a value of about 70. At this point a water-soluble product of high viscosity was obtained. Aqueous solubility was found to decrease when the reaction was allowed to proceed until the acid number of the product reached values materially below 70. The solubility of the fumaric esters is relatively poorer than for the corresponding maleic esters and for this reason the fumaric esters are not quite so desirable for my purposes as the maleic esters. The use of limited amounts of excess glycol will, however, improve their solubility.

In place of the hexaethylene glycol described in the examples, I may use equivalent proportions of other polyglycols having at least three ether linkages, including tetra-ethylene glycol, penta-ethylene glycol, or higher homologues. Instead of, or in addition to these glycols, I may substitute other polyhydric alcohols containing at least three ether linkages and not more than three hydroxyl groups. Among such are the reaction products of ethylene oxide with glycerol and like polyhydric alcohols.

A trihydric ether-alcohol suitable for use in the present invention was produced by the chemical combination of approximately three mols of ethylene oxide with one mol of glycerol. This product, on analysis, was found to possess a molecular weight of 233 and distilled within the range of 165–182° C. at slightly less than one mm. pressure. It was employed in the following example:

*Example 3*

| | Parts by weight |
|---|---|
| Trihydric ether-alcohol derived from glycerol and ethylene oxide | 78 |
| Maleic acid | 58 |

An extremely viscous liquid condensation product was obtained on reacting this mixture at 190° C. during a period of one hour. This product was water-soluble and has an acid value of 171. Upon continued reaction the product became insoluble and finally infusible. By increasing the ratio of the ether-alcohol to 50% in excess of the foregoing proportions a product was obtained having an acid value of but 34.8 and this product was soluble in water, a 50% aqueous solution of the same having a viscosity of 1.65 poises.

The unique physical properties of the compositions as described are such as to render them useful as flexibilizing and softening agents for many substances including especially glues, gelatin, urea-formaldehyde condensates and the like. Preparation of such is readily accomplished by mixing the aqueous solutions. The products may also be used as wetting agents, textile or paper softeners or lubricants and the like. For the latter purposes the resinous compositions such as are represented in the case of Examples 1 and 2 may be sulfonated or otherwise rendered more polar as by combination with bisulfite.

The oxygen-convertible nature of my esters renders their water solutions of additional value since these aqueous compositions may be used for coating and impregnating surfaces or objects for protection and decoration.

Commercial glues of several types, i. e., "bone glue", "hide glue", and "fish glue" were dissolved in water to yield solutions of from 18 to 25% glue content. Portions of each of these solutions were blended with solutions of the ester of Example 1 so that the resulting mixture contained equal parts by weight of glue and ester. These solutions were then applied to paper and allowed to dry for several hours. The addition of product 1 was observed to have provided coatings which were very much more flexible than those from the unblended glues. At room temperatures the esters oxidize very slowly in the absence of a catalyst. If, however, these coated papers were subjected to a temperature of 150° C. for but from 3 to 4 minutes, then drastic differences were observed. The glues which did not contain my esters became very brittle and cracked and lifted from the paper in many places while the coatings remained water-soluble. In the presence of the equal proportion of resin 1, the coatings remained flexible and adherent to the paper. Moreover, when spot tested with water or even when held under a water faucet for a few minutes there was no longer the solution, nor even marked softening of the film, as in the case of the unmodified glues.

Various papers were impregnated with the 50% aqueous solution of Example 1. As the water evaporated transparent or translucent effects were observed according to the quality of the paper. Conversion of the resinous impregnant did not occur at room temperature within a period of several days, but on the other hand was effected in from 3 to 4 minutes at 150° C. The resulting product was found to be highly water resistant while the air-dried samples were easily softened and the resins dissolved out upon contact with water.

Instead of by heating, one may likewise effect the oxygen-conversion by exposure of the coated surfaces to ultraviolet radiation. Both the ultraviolet and heating treatments are rendered most effective by incorporating an oxidation catalyst in the resin or in its solutions in the form of a water-soluble cobalt salt or of water-soluble peroxides. Catalysts of this nature bring about oxidation of the coating in a relatively short time, even in the absence of added heat or light.

To a 50% aqueous solution of product 1 was added 0.25% of cobalt in the form of the nitrate. This was used to impregnate a cotton fabric and the same was observed to have dried and become water resistant during 6⅔ hours at 60° C. while the identical treatment in the absence of the cobalt was found to have been insufficient to convert the resin to the water-insoluble form.

Coating, impregnating or adhesive compositions are thus derived from the resinous esters of the present invention in which aqueous solutions of the resins alone or of their mixtures with glue or other film-forming agents are employed. After application of these solutions to suitable surfaces, they are dried and the resin is rendered insoluble in water. It will be obvious that compositions of this type may be varied considerably according to the specific objects in view without departure from the purpose and scope of this invention. Such compositions are useful for coating wall paper and other paper or textile products and the like. They may also be used as adhesives for abrasive papers and similar purposes.

The addition of from 10 to 50% of the aqueous solutions of Examples 1 and 2, to condensation products of urea and/or of thiourea with aqueous formaldehyde has been found to be effective as a means of flexibilizing the resins obtained from such condensation products. For this purpose it is usually advantageous to neutralize the solutions of my esters in order to prevent premature gelation which is occasioned by the acid catalysis of urea-formaldehyde condensation products.

I have found that a still further use of my aqueous solutions is in admixture with water-soluble cellulose ethers such as certain of the methyl, ethyl and similar ethers of cellulose which can be dissolved in water. Such mixtures are suitable as coatings, impregnants, etc. to give tough, flexible films and the like.

For the purposes of the present invention maleic acid and maleic anhydride are interchangeable and either may be used in equivalent proportions. It will be apparent that the present invention is susceptible of some change and modification as already indicated, care being taken to ensure the production of the water-soluble products having the property of oxygen-convertibility.

I claim:

1. A composition comprising an aqueous solution of an oxygen-convertible ester of a polyhydric alcohol and an acid selected from the group consisting of maleic acid, maleic anhydride and fumaric acid, said polyhydric alcohol containing at least three ether linkages in the chain separating the OH groups and having not over three hydroxyl groups, said esters being soluble in water without the aid of alkaline solubilizing materials.

2. The composition of claim 1 which includes a water-soluble oxidation catalyst.

3. The composition of claim 1 which includes water-soluble glue and an oxidation catalyst.

4. A composition comprising an aqueous solution of an oxygen-convertible ester of hexaethylene glycol and maleic acid, said esters being soluble in water without the aid of alkaline solubilizing materials.

5. The composition of claim 4 which includes an oxidation catalyst.

6. The composition of claim 1 which includes a water soluble and compatible material selected from the group consisting of glues, gelatine, urea formaldehyde condensates and cellulose ethers.

7. The composition of claim 1 which includes a compatible material which is water dispersible.

THEODORE F. BRADLEY.